2,838,473
RAPID METHOD FOR PRODUCING STABLE NOVOLAKS

Alexander M. Partansky, Concord, and Mack A. King, Jr., Walnut Creek, Calif., assignors to The Dow Chemical Company, Midland, Mich., a corporation of Delaware No Drawing. Application September 28, 1953
Serial No. 382,851

4 Claims. (Cl. 260—57)

This invention relates to a rapid method for making stable, high molecular weight novolaks from phenol and formaldehyde.

"Novolak" is a term which has long been used to mean a phenol-aldehyde condensation product which is permanently thermoplastic. Such resins, generally, are known to be made using a mol ratio of aldehyde to phenol less than 1.0, and in the presence of an acid catalyst.

The principal use for novolaks from trifunctional phenols heretofore has been in the preparation of thermosetting resins by the so-called two-stage process. The first stage resin, or novolak, may be stored at room temperature almost indefinitely without setting, and may be treated whenever desired with more aldehyde, usually supplied in chemically combined form as hexamethylene tetramine, and heated to effect the second stage conversion from a thermoplastic to a thermoset condition. With exceptions to be noted below, novolaks have found little application in varnishes and other oleoresinous coatings. The only novolaks which have been deemed useful in such coatings are those made from difunctional parahydrocarbon-substituted phenols wherein the hydrocarbon constituent contains at least 3 carbon atoms and may be a normal or branched alkyl group, a cycloalkyl group, an aryl group or an aralkyl group. Novolaks made from trifunctional phenols, or from such other difunctional phenols as the ortho-substituted phenols and the para-alkyl phenols in which the alkyl group contains less than three carbon atoms, have not been deemed useful in oleoresinous coatings for several reasons but mainly because of their limited solubility in oils. It has also been observed in the coatings industry that varnishes containing novolaks made from para-substituted phenols, especially when the substituent hydrocarbon group is $C_4$ or larger and is attached to the benzene ring through a tertiary carbon atom, remain lighter in color when the dried varnish film ages (particularly in the sunlight) than when the para position is unsubstituted, as in ortho-substituted phenols or in trifunctional phenols. This discoloration observed with novolaks from phenols other than those with a tertiary carbon substituted in the para position is believed to be due to the formation of a paraquinoid type of structure which is recognized as being a strong chromophore. There is much less tendency with para-substituted phenol novolaks to form the relatively weak ortho-quinoid chromophore structure, and their oleoresinous coatings are relatively free from color.

The oil solubility of substituted phenol novolaks can be improved and those that are normally oil insoluble, e. g. those from common phenol, can be made to dissolve in the oil by reacting these novolaks with olefin oxides or with chlorohydrins to produce hydroxyalkyl ethers of the novolaks and then esterifying the alcoholic hydroxyl groups so formed with long chain hydrocarbon acids. The degree of esterification necessary to solubilize hydroxyalkyl ethers of novolaks varies, depending on the initial phenol in the novolak and on the oxide used. Thus for the most insoluble common phenol novolak etherified with ethylene oxide it takes about 0.4 equivalent of linseed oil fatty acids (for example) per phenolic nucleus to render it oil soluble in all proportions. Heretofore, such successive etherification and esterification reactions have been recommended for use with novolaks from difunctional and preferably para-substituted phenols in which the substituent group is at least $C_4$ or larger. When such ether and ester products are made from the trifunctional phenol novolaks prepared according to the teachings of the prior art, it is found that considerable crosslinking occurs with the development of gels or partial gel products which are unsuitable for the use as oleoresinous coating. It has been found that this objectionable gel formation is traceable to the novolaks, and that those properties which lead to gel formation are, in turn, traceable to the conventional manner in which novolaks have been made.

The usual procedure for making a novolak is to heat a mixture of one mol of the phenol and up to one mol of the aldehyde, in the presence of a catalyst which is usually an acid, and at the reflux temperature of the mixture. Especially in large batches, cooling is usually applied to the batch to maintain gentle reflux and prevent the reaction from becoming violent. When all of the aldehyde has combined with the phenolic compound, the aqueous layer is decanted and the viscous reaction product is dehydrated by heating it, usually under reduced pressure. Such novolaks from trifunctional phenols, when made by conventional methods, because of the previously described tendency to gel formation in their hydroxyalkyl ethers and in the esters of such hydroxyalkyl ethers, will be referred to herein as "unstable" novolaks, to distinguish them from the "stable" novolaks of this invention which do not exhibit the gel forming tendency in the corresponding chemical derivatives. It is thus apparent that, in order to be useful in oleoresinous coatings, a novolak must be initially oil soluble, or must be capable of being made oil soluble through etherification-esterification reactions without forming gels in the process.

In a concurrently filed application of Alexander M. Partansky and Paul G. Schrader, Serial No. 382,852, there is described a method for making stable novolaks. That method comprises heating a phenol with from 0.65 to 0.875 mol of aldehyde for each mol of the phenol and with an initial amount of water or other inert aqueous diluent at least 0.5 times the weight of the phenol, under superatmospheric pressure and in the presence of oxalic acid or other strong acid catalyst, to a temperature from 120° to 200° C. The mixture is heated externally to 80° to 100° C., whereupon the exothermic reaction increases the temperature to 120° or higher, and usually to above 150° C. When the exothermic flare-up subsides, a temperature above 120° C. is maintained until the aldehyde has all reacted. The resulting novolak is stabilized, i. e., freed from alcoholic hydroxyl groups, by further chemical reaction, preferably with more phenol and catalyst at 100° to 160° C. The primary condensation reaction requires from 1 to 3 hours, and the secondary reaction, for "scavenging" the methylol groups requires an additional 1 to 2 hours. While that procedure furnishes a stable novolak, it would be deemed preferable to be able to make an equally stable product from ordinary phenol and formaldehyde in a much shorter time and without necessity for a stabilizing after-treatment. The attainment of said desired end is the principal object of this invention.

Stable novolaks may be made from ordinary phenol and formaldehyde by a rapid, single step procedure according to the present invention. The new method consists essentially in heating the reaction mixture, whose limits will be described below, in a closed vessel, only until the vigorous exothermic reaction is underway, and then allowing the reaction to proceed under superatmospheric pressure without cooling and without introducing more heat, until a peak temperature and pressure is attained, and then allowing the mixture to cool to a temperature below 150° C. before applying positive cooling to bring the mixture at atmospheric pressure. The time required for the mixture to attain maximum temperature and pressure after the exothermic reaction begins near 80° to 90° C. is of the order of 5 to 15 minutes, and the time required for the mixture to cool from peak temperatures in the range from 160° to 200° C. is of the order of 10 to 30 minutes. The product can be discharged from the reactor within an hour after the exothermic reaction starts, and, in many cases this has been done within 30 to 45 minutes after the start of the reaction.

The reaction mixture which can be used successfully in the method of the invention consists essentially of ordinary phenol, $C_6H_5OH$, from 0.5 to 0.9 mol of formaldehyde per mol of phenol, from 0.5 to 2.0 parts by weight of water per part of phenol, and from 0.1 to 5.0 (preferably 0.3 to 1.0) percent of a strong mineral acid based on the weight of phenol. Oxalic acid and the weak mineral acids and organic acids cannot be used in the rapid method of this invention to produce stable novolaks. Such weaker acids require longer reaction times to form equivalent products. The preferred catalytic acids are sulfuric acid and hydrochloric acid.

The aldehyde-to-phenol ratio affects the molecular weight of the novolak to be produced. In the present method, mol ratios of as little as 0.5 give stable novolaks with molecular weights of 450 or higher, and mol ratios of 0.85 to 0.9 give stable novolaks with molecular weights over 800. In the past, emphasis has been placed on the use of mild conditions of reaction over long periods of time in the belief that such conditions favored completion of the reaction and freedom from residual reactive methylol groups. This has been especially true when the mol ratio of aldehyde to phenol has been near 0.9, and it is believed surprising that a brief but violent reaction converts such a phenolformaldehyde mixture to a stable novolak, essentially free from methylol groups.

The water employed in the reaction medium absorbs heat and eliminates localized overheating of the mixture. It appears to regulate or modify the molecular weight distribution in the novolak product, as the presence of less than 0.5 part by weight of water per part of phenol leads to gelling during the reaction, especially in the upper range of aldehyde ratios. There may be used without disadvantage as much as 4 to 5 times as much water as phenol, but no useful purpose is served by amounts of water in excess of 2 times the weight of phenol. The water present includes that in the formaldehyde and other reagents, but is usually in excess of that which could be supplied in commercial concentrated formalin solution of 36 to 40 percent concentration.

The following examples illustrate the practice of the invention:

*Example 1.—Contrast between sulfuric acid and oxalic acid catalysts*

Two batches of novolak were prepared from substantially identical reaction mixtures, with 2 percent oxalic acid (based on the weight of phenol) as the catalyst for one batch and 0.5 percent of concentrated sulfuric acid for the other. Both batches had 0.82 mol of formaldehyde per mol of phenol. The oxalic acid catalyzed batch had 0.8 part by weight of water per part of phenol, while the sulfuric acid catalyzed batch had 0.9 part of water per part of phenol. The smaller amount of water was used with oxalic acid to see whether, with less diluent, this batch could react as rapidly as the other. The reagents were sealed, in both cases, in a jacketed glass-lined pressure vessel of about 19 liters capacity, fitted with a stirrer, and they were heated to a reaction temperature near 90° C. at a rate of about 1.5 degrees per minute by circulating hot oil through the jacket of the kettle. When reaction started, heat was no longer supplied through the jacket. The time-temperature-pressure curves were plotted for each run, past the peaks on each curve and until the temperature of each batch had dropped to about 140° C. The novolaks were then cooled and the mixtures were neutralized, the aqueous layer was decanted, the novolaks were steamed to remove any free phenol, and the products were dried. The pretinent data appear in Table I.

TABLE I

| Time, Minutes after reaching 90° C. | Run No. 114 (Sulfuric acid catalyst) | | Run No. 56 (Oxalic acid catalyst) | |
|---|---|---|---|---|
| | Temp., ° C. | Pressure, lbs./sq. in. | Temp., ° C. | Pressure, lbs./sq. in. |
| 0 | 90 | 20 | 90 | 20 |
| 3 | 102 | 24 | 94 | 21 |
| 5 | 120 | 38 | 97 | 22 |
| 6 | 144 | 100 | 99 | 23 |
| 7 | 180 | 162 | 102 | 24 |
| 8 | 178 | 150 | 104 | 25 |
| 9 | 174 | 137 | 106 | 26 |
| 10 | 171 | 127 | 108 | 27 |
| 15 | 157 | 96 | 134 | 57 |
| 20 | 150 | 80 | 162 | 112 |
| 25 | 146 | 72 | 154 | 92 |
| 30 | 142 | 68 | 146 | 80 |
| 35 | 140 | 67 | 141 | 71 |
| 40 | 140 | 67 | 140 | 65 |
| Melting point of novolak, ° C. | 108 | | 110 | |
| Molecular weight of novolak | 806 | | 835 | |

It is noted that, even with the larger amount of diluent present, the sulfuric acid catalysed reaction was much more vigorous than that in which oxalic acid was used, and that the peak temperature and pressure conditions were reached in one-third the time. The maximum temperature reached in run No. 114 was 182° C., and the corresponding pressure was 163 pounds, both values being noted 6½ minutes after the batch temperature passed 90° C. The corresponding values in run No. 56 were 162° C. and 113 pounds pressure, both after an elapsed time of about 20 minutes.

*Example 2*

The apparatus described in Example 1 was charged with:

7400 grams of phenol
5490 grams of 36.5% formalin
200 grams of 37% hydrochloric acid
5264 grams of additional water The aldehyde-to-phenol mol ratio was 0.82, the initial weight ratio of total water-to-phenol was 1.2, and the hydrochloric acid contained 1.0 percent of hydrogen chloride, based on the weight of phenol. The vessel was sealed and heated as before. The peak temperature and pressure occurred in about 10 minutes after the mixture reached 90° C. The mixture was allowed to cool in the kettle after the vigorous reaction had subsided and the total time at temperatures above 150° C. was about 20 minutes. The kettle was cooled to atmospheric pressure and was opened and the aqueous layer decanted in less than an hour after the start of the exothermic reaction. The novolak was steamed to remove free phenol and was dried. It had a molecular weight of 848, representing 8.1 phenol units per average mol, and a melting point of 124° C.

Example 3

In like manner, a novolak was made from a charge consisting of:

8100 grams of phenol
5802 grams of 36.5% formalin
1900 grams of water
42 grams of 98% sulfuric acid The aldehyde-to-phenol ratio was 0.82 molar, the water-to-phenol ratio was 0.69 by weight, and the catalyst was 0.5% of the weight of phenol. When the temperature of the mixture reached 90° C., the exothermic reaction became quite vigorous and the temperature rose rapidly to 190° C., after which the mass began to cool. The total time at temperature above 150° C. was only 13 minutes. The mass was cooled to a temperature below 100° C., and the kettle was opened in less than an hour after the start of the exothermic reaction.

The mixture was neutralized with barium hydroxide, supernantant water was withdrawn, and unreacted phenol was steamed from the novolak which, upon drying, was found to have a molecular weight of 835 and a melting point of 111° C.

The novolak was dissolved in 5370 grams of dioxane and there was added 44.5 grams of powdered barium hydroxide. This mixture was sealed in the same kettle and heated to 160° C., after which 4450 grams of propylene oxide was pumped in slowly, followed by 570 grams of ethylene oxide. Heat of reaction carried the temperature to 208° C. The mixture was at a temperature above 150° C. for nearly 4 hours. The dioxane solution of the mixed hydroxyalkyl ethers of the novolak was neutralized with citric acid and the solvent was distilled off. There was obtained 12,700 grams (93% yield, based on original phenol) of the hydroxyalkyl ether product, having a molecular weight of 1150, a melting point of 76° C., and an alcoholic hydroxyl equivalent weight of 161.5 (determined by esterification with a saturated fatty acid in excess, and back-titration).

A mixture of 5.21 equivalents of the hydroxy-alkyl ether product and 4.17 equivalents of linseed oil fatty acids was heated for 12.5 hours at 235° C., at which time the acid number of the oil had dropped to 2.1 and its viscosity, measured on a 70% solution in xylene at room temperature, was 800 centipoises. The ester product showed no evidence of gelling, and its mixtures with either aromatic hydrocarbons or aliphatic varnish thinners were clear. The ester gave hard, tough films when mixed with 0.3% lead naphthenate and 0.05% cobalt naphthenate and applied as a coating which dried tack-free in less than two hours.

Example 4

A novolak was made by the present rapid process from:

8150 grams of phenol
5810 grams of 37% formalin
2830 grams of water
41 grams of concentrated sulfuric acid The molar ratio of aldehyde-to-phenol was 0.825, the weight ratio of water-to-phenol was 0.8, and the weight of acid catalyst was about 0.5% of the weight of phenol. Reaction was effected as before, with a temperature of 155° C. being the maximum attained within 5 minutes after the exothermic reaction started. The mixture was cooled slowly, and when the temperature dropped to 80° C., the acid was neutralized with sodium hydroxide, the novolak was washed with hot water, and was dried. The entire batch of novolak was dissolved in 5350 grams of dioxane, made alkaline with 58 grams of 50% aqueous sodium hydroxide, and heated in a closed vessel to 180° C. There was introduced under pressure 4510 grams of propylene oxide and 1360 grams of ethylene oxide and heating was continued to a total of 5.5 hours. When neutralized with acid, washed and dried, the mixed hydroxyalkyl ethers of the novolak weighed 12,600 grams and had an alcoholic hydroxyl equivalent weight of 157.6.

The mixed hydroxyalkyl ether of the novolak was heated with 0.8 equivalent weight of linseed oil fatty acids at 235° C. until the acid number of the cook was reduced to 2.9 and the viscosity of a 70% solution of the resulting ester in xylene at room temperature was 930 centipoises. No sign of gel formation was found in the ester, alone or when mixed with aliphatic or aromatic thinners. When the oily ester was mixed with lead-cobalt driers and applied as a coating, a hard and tough, alkali-resistant film was obtained which air dried to a tack-free condition in 80 minutes.

By way of contrast, when a novolak, prepared as in Example 1 with oxalic acid catalyst, was etherified with alkylene oxides and the resulting hydroxyalkyl ether was esterified as described above with drying oil fatty acids, the esterification could not be carried to acid numbers below 10 without noticeable gel formation and the ester was consequently incapable of giving clear solutions when cut with aliphatic varnish thinners. An even greater contrast was noted between the novolaks made by the present rapid process and those made by the conventional procedure involving prolonged (6 to 24 hours) refluxing af the reagents at atmospheric pressure. The corresponding ester products of such novolaks gelled badly when prepared in the manner described in Examples 3 and 4.

It is apparent that stable novolaks may be made rapidly, with strong mineral acid catalysts, according to the method of this invention, and that comparable reaction conditions do not give as stable novolaks of high molecular weight when the catalyst is oxalic acid.

Because of the speed of the condensation reaction under the conditions described, the present process is adapted to continuous operation in a coil or in a column, under pressure, as well as to the described batch operation. Such apparatus is intended to be included in the meaning of the term "a pressure vessel" in the appended claims.

We claim:

1. The rapid method for making a stable novolak from phenol and formaldehyde which comprises supplying to a pressure vessel a mixture consisting essentially of (a) phenol, (b) from 0.5 to 0.9 mol of formaldehyde per mol of phenol, (c) from 0.5 to 2 times as much water as phenol by weight and (d) from 0.1 to 5 percent, based on the weight of phenol, of a strong mineral acid, closing the vessel, supplying heat to the mixture only until vigorous exothermic reaction is first evidenced, maintaining the mixture in said closed vessel under the varying autogenous superatmospheric pressure until the temperature and pressure values cease rising and start to decline; and then allowing the closed vessel and the mixture therein to cool by unaided radiation to a temperature below 150° C., and thereafter cooling the mixture in the closed vessel until the pressure in the vessel is atmospheric pressure.

2. The method claimed in claim 1, wherein the mineral acid employed as catalyst is sulfuric acid in amount from 0.3 to 1 percent of the weight of phenol.

3. The method claimed in claim 1, wherein the mineral acid employed as catalyst is hydrochloric acid in amount from 0.3 to 1 percent of the weight of phenol.

4. The method claimed in claim 1, wherein the mol ratio of formaldehyde to phenol is about 0.8 to 0.85 and the weight ratio of water-to-phenol is about 0.7 to 1.2.

References Cited in the file of this patent

UNITED STATES PATENTS

| 924,449 | Gentsch | June 8, 1909 |
| 1,660,403 | Turkington | Feb. 28, 1928 |
| 2,456,192 | Houlton | Dec. 14, 1948 |

OTHER REFERENCES

Carswell: Phenoplasts, pub. by Interscience Publishers Inc., New York (1947), page 33.